April 2, 1935.  J. E. PADGETT  1,996,169
APPARATUS FOR USE IN ASSEMBLING GEARING IN HOUSINGS
Filed Nov. 4, 1932  3 Sheets-Sheet 2

INVENTOR:
JOSEPH E. PADGETT
ATTORNEYS

April 2, 1935.  J. E. PADGETT  1,996,169
APPARATUS FOR USE IN ASSEMBLING GEARING IN HOUSINGS
Filed Nov. 4, 1932  3 Sheets-Sheet 3

INVENTOR:
JOSEPH E. PADGETT
ATTORNEYS

Patented Apr. 2, 1935

1,996,169

UNITED STATES PATENT OFFICE 1,996,169

APPARATUS FOR USE IN ASSEMBLING GEARING IN HOUSINGS

Joseph E. Padgett, Toledo, Ohio

Application November 4, 1932, Serial No. 641,220

11 Claims. (Cl. 33—181)

This invention has to do with the assembling of gearing in gear housings, and more particularly this invention relates to the assembling of differentials in the differential housings of vehicle axles.

An object of the present invention is to provide a novel method and means for accurately and economically determining the correct assembly positions for differentials in the differential housings of vehicle axles.

Another object of this invention is to provide a novel method for determining the correct assembly positions for differentials in differential housings, which are constructed as single piece metal castings, comprising relatively adjusting the differential and housing to obtain a desired cooperation between the differential gear and the drive pinion, measuring the spacer thickness required to retain the differential in such relative position, and then mounting the differential in the housing by the use of spacers of the thickness determined by such measuring.

Another object of this invention is to provide a novel method for determining the shim thickness required for positioning differentials in differential housings of the one piece type, wherein a differential having bearing thrust surfaces thereon, and a differential housing having bearing thrust surfaces thereon, are relatively adjusted to obtain a desired back-lash between the main gear and the drive pinion, and then measuring the variation from standard existing in the spacing of the thrust surfaces of the differential from the thrust surfaces of the housing.

Still another object of the invention is to provide a novel method for determining the correct assembly positions for differentials in one piece differential housings of the type having a plurality of sets of integrally formed differential bearing seats, wherein the differential is first supported in spaced members corresponding substantially with the differential bearings, and wherein the housing is positioned with one set of such bearing seats in engagement with the differential supporting members and with the drive pinion of the housing meshing with the main gear of the differential, after which the housing is adjustably shifted to obtain a desired predetermined back-lash between the drive pinion and the main gear, and then measuring the clearance between the differential supporting members and another set of bearing seats on the housing to determine the thickness of compensating shims required, and then assembling the differential in the housing by the use of shims of a thickness determined by such measurements.

A further object of my invention is to provide novel apparatus for rapidly and economically carrying out my novel method.

It is also an object of my invention to provide novel apparatus of the type referred to, embodying a pair of bearing-like supports adapted to receive the journals of a differential, and also embodying means for supporting a differential housing in such manner that it can be adjustably shifted relative to the differential supporting means for obtaining a predetermined back-lash between the main gear of the differential and a drive pinion in the axle housing.

Yet another object of my invention is to provide apparatus of the type referred to, embodying novel means for measuring the variation from standard existing between bearing seats of the axle housing and the bearing seats of the differential after the housing and differential have been relatively adjusted to obtain a desired back-lash between the differential gear and the drive pinion.

The invention may be further briefly summarized as consisting in certain novel combinations and arrangements of parts and in certain novel operations and steps of procedure, hereinafter described and particularly set out in the appended claims.

In the accompanying sheets of drawings.

Detailed reference will now be made to the accompanying drawings showing novel apparatus for use in assembling differentials into the differential housings of vehicle axles, and which may be used in carrying out the novel method of my invention. It will be understood, of course, that my invention is not to be regarded as limited to the particular arrangement of apparatus herein illustrated and described, nor to the use of this particular apparatus in carrying out my novel method.

Figure 4:
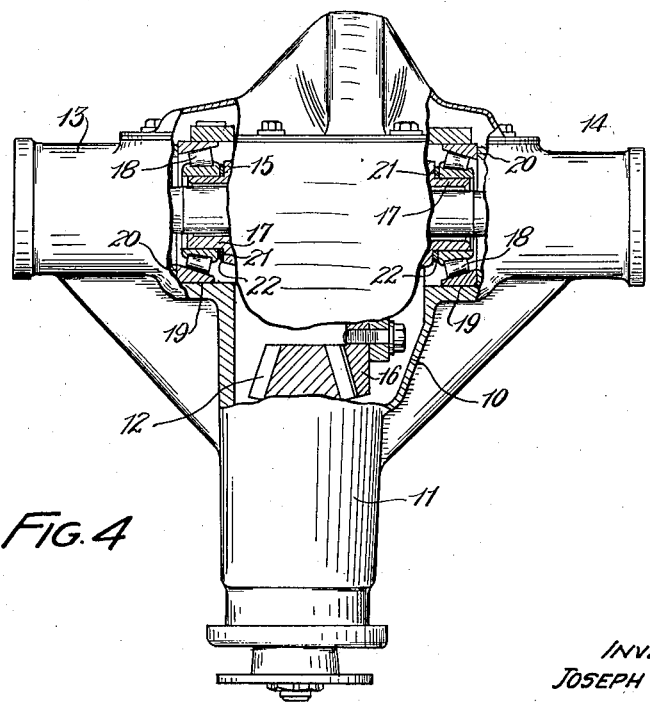
Fig. 4 is a plan view with parts broken away, showing the gear carrier or housing of a vehicle axle which has been assembled by the use of the novel method and apparatus of my invention.

Before proceeding with a detailed description of my novel method and apparatus, I shall describe briefly the construction of one form of vehicle axle which may be assembled by the use of my novel method and apparatus. As shown in Fig. 4 of the drawings, this axle comprises a one piece cast metal housing or gear carrier 10, having an integral forwardly extending projection 11 in which the drive pinion 12 is mounted, and also having integral laterally extending projections 13 and 14 on which the differential 15 is supported. The differential is provided with a main gear 16, which meshes with a drive pinion 12 supported in the projection 11, and is also provided with laterally extending journals 17 which are mounted in the differential bearing 18. The projections 13 and 14 of the gear housing are each provided with a radial bearing seat 19 and an end bearing seat 20 for correctly positioning the differential bearings 18. End bearing seats 21 are also provided on the differential adjacent the journals 17 thereof, so that by the use of suitable shims 22 the differential may be positioned in the gear housing with the gear 16 meshing with, and co-operating with, the drive pinion 12 with a desired lost motion or back lash therebetween.

In accordance with my novel method, I determine the thickness required for the shims 22 to compensate for variations in the differential housing and the other parts of the axle, so that when the differential and the differential bearings are assembled in the housing with a desired press fit, the main gear and the drive pinion will cooperate efficiently with a desired amount of back-lash therebetween. In carrying out this novel method I arrange the differential 15 on a suitable support or fixture having portions corresponding substantially with the differential bearings 18 of the axle, and then position the housing around the differential with the differential supporting portions engaging the radial seats 19 of the axle housing and with the main gear of the differential meshing with the drive pinion. The engagement of the differential supporting portions with the radial seats 19 correctly positions the differential with respect to the axes of the integral projections 13 and 14.

The differential housing, and the differential as thus supported, are then relatively adjusted, preferably by adjustably shifting the large end of the housing, or in other words, the upper end of the housing as seen in Fig. 4, to thereby obtain a cooperation between the main gear 16 and the drive pinion 12, such that a desired back-lash exists between these gear elements. After the main gear and the drive pinion have thus been brought into the desired cooperating relation with a predetermined back-lash therebetween, as may be indicated by a suitable gauge, I then measure the extent of variation from standard existing between the differential and the gear housing, or, in other words, the variation from standard existing in the spacing of the bearing seats or thrust surfaces 21 of the differential and the bearing seats or thrust surfaces 20 of the housing, for which variation compensation must be made by the shims 22. The measurements thus taken indicate directly the exact thickness required for each of the shims 22, so that when the differential is assembled in the housing, as shown in Fig. 4, with a desired press fit, the main gear and the drive pinion will cooperate with the desired back-lash therebetween.

Figure 1:
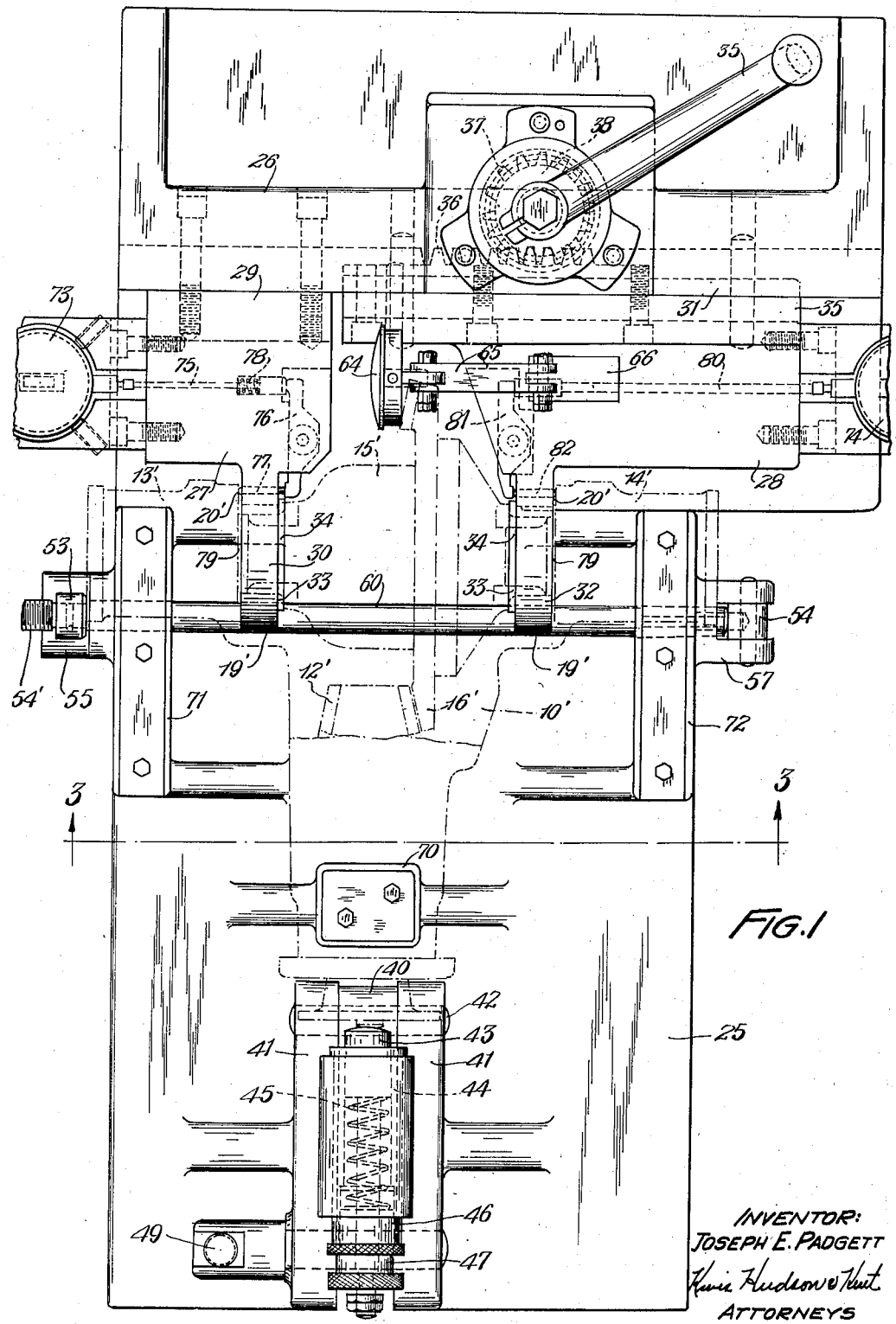
Fig. 1 is a front elevational view showing novel apparatus for use in assembling vehicle axles in accordance with my invention.
Figure 2:
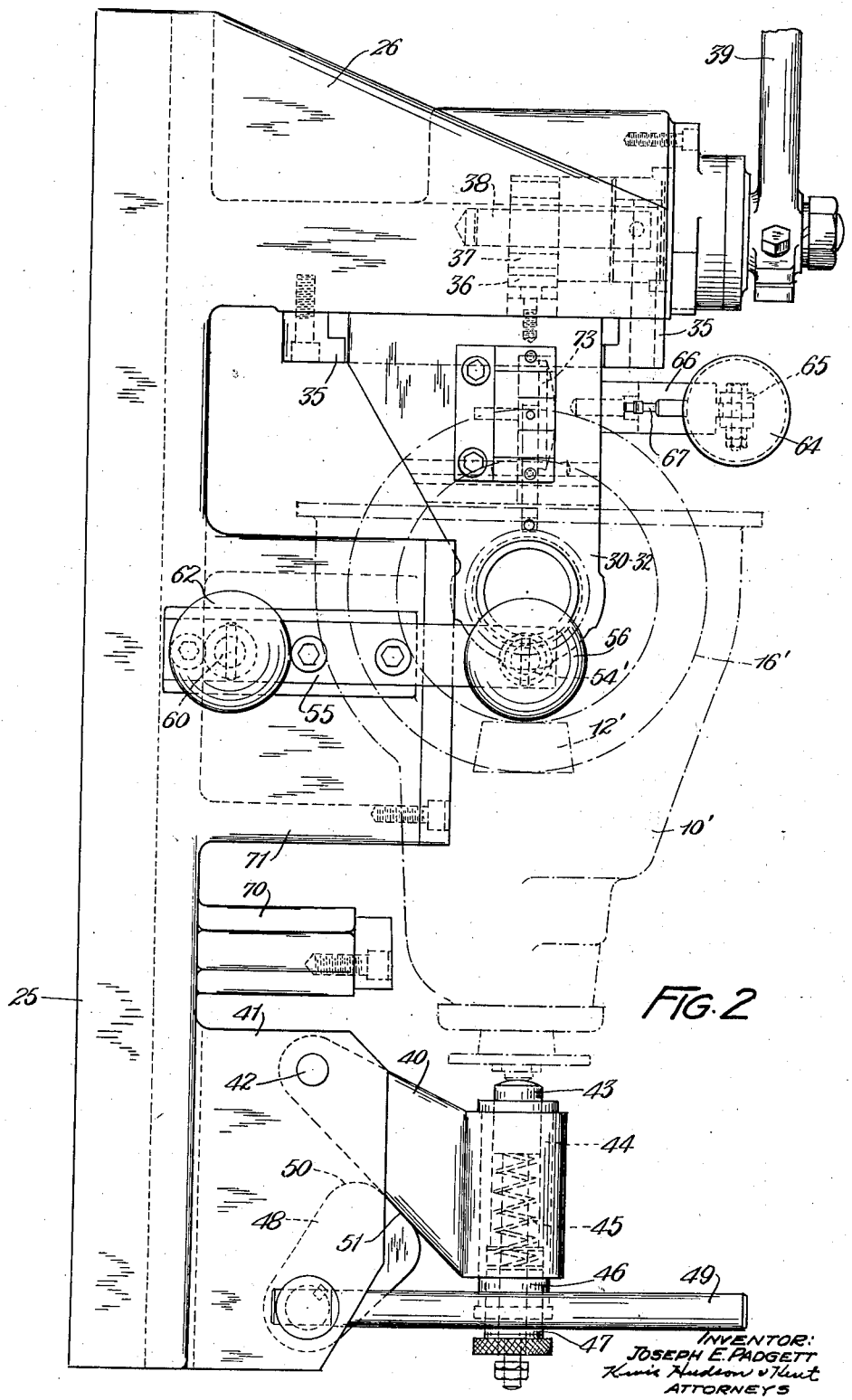
Fig. 2 is a side elevational view of the apparatus.
Figure 3:
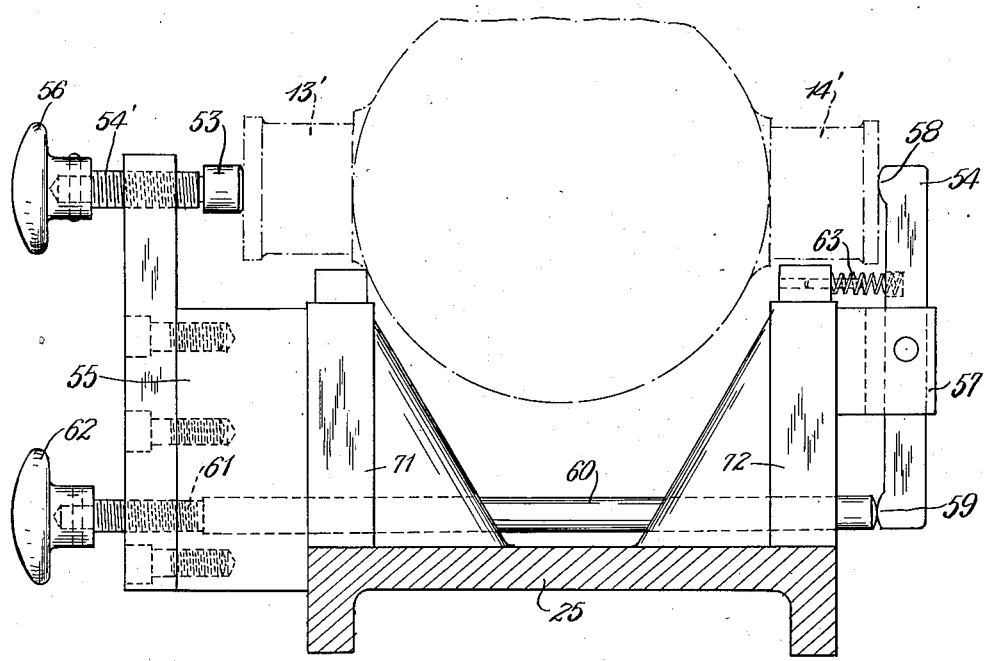
Fig. 3 is a sectional view of the apparatus taken substantially as indicated by line 3—3 of Fig. 1.

Although various forms of fixtures or apparatus may be used in carrying out my novel method, I have devised a novel form of fixture, whereby this method of assembling differentials in differential housings can be carried out rapidly and with a high degree of accuracy. A preferred form of this novel apparatus is shown in Figs. 1, 2 and 3 of the drawings, but it will be understood, of course, that my invention is not to be regarded as limited in scope to the use of this particular form of apparatus.

My novel form of apparatus or fixture, as shown in the drawings, is provided with a frame 25, which may be arranged in a substantially upright position. This frame is constructed of any suitable material, such as cast metal, and is provided adjacent the upper end thereof with a forwardly extending bracket 26 from which the differential supporting members 27 and 28 depend. The differential support 27 comprises a block 29, which is bolted or otherwise secured to the bracket 26, and an integral depending projection 30. This depending projection, as will be presently explained more in detail, supportingly receives one of the journals of a differential 15' which is to be assembled into a differential housing 10'.

The differential support 28 comprises a laterally shiftable block or mount 31, having a depending integral projection 32 which supportingly receives the other journal of the differential 15'. The integral projections 30 and 32 are preferably cylindrical in shape, as shown in Fig. 2 of the drawings, so as to correspond substantially as to size and shape with the differential bearings 18 of the assembled axle. The projections are provided with aligned openings to receive the journals of the differential 15', and, if desired, the openings of the projections may be adapted for accurate cooperation with the journals of the differential by fitting suitable bushings 33 into the openings of these projections. These bushings are preferably constructed with an end flange 34 thereon, of such thickness that when the bushings are assembled in the projections the combined thickness of each projection with its bushing flange will correspond substantially exactly with the over-all length of the differential bearings 18.

I find it desirable to construct the differential support 28 so that it may be moved laterally relative to the differential support 27, to thereby facilitate engagement and disengagement of the differential journals in the bushings 33, and to this end I arrange the block 31 for lateral sliding movement on the bracket 26. Although any suitable means may be provided for slidably mounting the block 31 on the bracket 26, I have here shown the bracket as having undercut guides or ways 35 arranged in spaced relation and suitably secured to the underside of the bracket to slidably support the block 31.

For moving the differential support 28 toward or away from the differential support 27, I provide the block 31 with a rack 36, which is engaged by a pinion 37. This pinion is mounted on an actuating shaft 38, which is journaled in the bracket 26, and may be oscillated by means of a suitable handle 39 which is secured to the outer end of the pinion shaft. With the arrangement as thus described it will be seen that by oscillating the hand lever 39, the operator may shift the differential support 28 away from the support 27, to permit the journals of the differential 15' to be arranged for engagement in the bushing 33, and by movement of the hand lever 39 in the opposite direction, the support 28 may be moved toward the support 27 to cause the depending projections 30 and 32 to engage the journals of the differential in the same relation as the bearings 18 in the axle assembly shown in Fig. 4.

My novel fixture is also provided with a hinged bracket or lever 40 for supporting the differential housing 10' in a desired position relative to the depending differential supporting projections 30 and 32. This bracket is preferably supported from the frame 25 by being hingedly mounted in a yoke formed by the integral frame projections 41. A suitable hinge pin 42 may be employed to extend through the bracket and the frame projections for this purpose. This swinging bracket cooperates with the lower end or pinion shaft projection of the housing so as to support the housing in position such that the cylindrical depending projections 30 and 32 engage the radial bearing seats 19' of the gear housing and the main gear 16' meshes with the drive pinion 12'. This bracket may be of any suitable construction, but is here shown as having a plunger 43, which engages the outer end of the shaft of the drive pinion 12', and which plunger is slidable in a bushing 44 mounted in the bracket. Movement of the plunger into the bushing is resisted by a coil spring 45 which is disposed around the plunger stem 46. A threaded sleeve 47 extends into the bushing 44 and may be adjusted relative to the bushing for adjustably varying the tension of the spring 45.

For actuating the swinging bracket 40 to move the housing 10' upwardly toward the differential 15', I provide actuating means in the form of a cam 48, which is pivotally mounted between the frame projections 41, and which may be oscillated by means of a suitable handle 49. This cam is provided with a rounded surface 50 which engages the bracket and swings the same upwardly upon its pivot 42 to move the axle housing toward the differential. The cam is also provided with a flat portion 51 which cooperates with a flat portion of the bracket to lock the latter, in the position shown in Fig. 2 of the drawings, to retain the axle housing in the desired position relative to the differential supports 27 and 28.

From the arrangement as thus far described, it will be seen that after the differential 15' has been mounted in the depending extensions 30 and 32, the operator positions the differential housing with the open end thereof disposed around the differential and with the outer end of the pinion shaft engaging the plunger 43 of the bracket 40. The operator then swings the handle 49 upwardly, causing the cam 48 to swing the bracket 40 in an upward direction thereby lifting the axle housing upwardly around the differential and causing the radial bearing seats 19' of the housing to engage the depending extensions 30 and 32 of the differential supports. This upward movement of the housing causes the drive pinion 12' to mesh with the main gear 16' of the differential and the action of the spring 45 results in the radial bearing seats 19' being firmly held against the differential supporting extensions 30 and 32. The engagement of these extensions with the radial seats 19' causes the differential to be correctly positioned with respect to the axes of the integral projections 13' and 14' of housing.

As is well understood in the automotive art, a certain amount of lost motion or back-lash is desirable between the drive pinion and the main gear of a differential for efficient cooperation of these parts of a vehicle axle. The desired amount of back-lash is a predetermined factor and the drive pinion and differential gear are cut accordingly. To insure this desired amount of back-lash being present in the assembled axle, it is important that the differential be correctly positioned in the housing relative to the axis of rotation of the pinion shaft. In differential housings of the type shown in Fig. 4 of the drawings having integral seats or thrust surfaces 19 and 20 for the differential bearings 18, such correct positioning of the differential relative to the axis of rotation of the pinion must be obtained by the use of shims 22, which compensate for variations existing in the parts. It will be understood, of course, that the variation from standard is a different value in each axle and that the shim thickness required, must be determined for each individual axle.

To position the drive pinion 12' and the main gear 16' in proper cooperating relation with the desired back-lash therebetween, I find it desirable to adjustably shift the housing laterally with respect to the axis of rotation of the pinion, although in some instances it may be desirable to obtain this desired cooperation by a shifting of the differential and the differential supporting means, instead of a shifting of the housing. Such shifting of the housing is accomplished, in this instance, by means of a button 53 for shifting the housing in one direction, and a lever 54 for shifting the housing in the opposite direction. The button 53 is carried by an adjusting screw 54', which is mounted in a suitable supporting bracket 55, the bracket and screw being arranged to cause the button 53 to engage the outer end of the projection 13' of the housing when the screw is rotated by means of the handle or knob 56. The lever 54 is pivotally mounted in a suitable bracket 57 and is provided at one end with a rounded contact portion 58 for engagement with the outer end of the integral projection 14' of the housing. The other end of this lever is provided with a rounded contact portion 59, which is engaged by one end of a push rod 60. This push rod is provided at its other end with a threaded portion 61, which engages in a threaded opening in the bracket 55, so that upon rotation of the push rod by means of the knob 62, the lever 54 will be swung in a direction to cause lateral shifting of the housing. A spring 63 may be arranged to swing the lever 54 in the opposite direction and to retain the contact portion 59 in engagement with the push rod.

When the housing has been placed upon the support and has been moved upwardly toward the differential 15' by means of the swinging bracket 40 to cause the depending extensions 30 and 32 to engage the radial seats 19' of the housing and the main gear 16' to mesh with the drive pinion 12', the operator then manipulates the knobs 56 and 62 to cause such lateral shifting of the housing as may be needed to position the main gear and the drive pinion for cooperation with the desired amount of back-lash therebetween. For visibly indicating to the operator when such correct positioning of the main gear and drive pinion has been obtained, I employ an indicator preferably in the form of a sensitive gauge 64, which cooperates with the main gear 16'. This gauge may be mounted in any suitable manner, but is here shown as being pivotally connected to one end of a link 65 which is, in turn, hinged to a bracket 66 which is mounted on the shiftable block 31. This gauge is provided with an actuating stem 67, which may be brought into contact with a tooth of the main gear 16' by swinging the gauge upon its mounting. In applying the actuating stem of the gauge 64 to the differential, the point of this gauge stem engages the outside of a tooth of the main gear, and with the contact point of the stem in this position the main gear is rocked back and forth in the bushings 32 by the operator, so that the extent of lost motion between the gear and pinion is indicated by the gauge. If the indicated lost motion between the teeth of the ring gear and the teeth of the pinion exceeds the predetermined back-lash desired, the operator manipulates the handles 56 and 62 to shift the housing toward the right, as seen in Fig. 1, or, in other words, in a direction to cause the teeth of the drive pinion to be moved into closer engagement with the teeth of the main gear. If the gauge reading indicates insufficient lost motion, the housing is shifted in the opposite direction by the operator. When the desired indication is obtained on the gauge 64 the operator then knows that the pinion and main gear are in proper position for cooperation with the desired amount of back-lash.

If desired, the initial positioning of the differential housing in the fixture may be facilitated to some extent by providing the frame 25 with a projection 70 which cooperates with the lower end of the housing, as seen in Fig. 2, and with laterally spaced projections 71 and 72 which cooperate, respectively, with the integral projections 13' and 14' of the housing. The projection 71 also provides a support for the bracket 55 and the projection 72 forms a support for the lever bracket 57.

When the housing has been adjustably positioned by manipulation of the knobs 56 and 62, and gauge 64 indicates that the main gear and the drive pinion coact with the proper amount of back-lash, the operator then knows that the differential occupies the position in the housing that it should occupy in the assembled axle, and that measurements of the variations from standard, then existing between the differential and housing, will indicate directly the thickness of shims required to compensate for such variations and to retain the differential in the desired position in the housing.

For measuring this variation from standard, or, in other words, the thickness of the shims required to correctly position the differential 15' in the gear housing 10', I employ suitable gauges 73 and 74 which are mounted, respectively, upon the differential supports 27 and 28. The gauge 73 is provided with an actuating stem 75 which cooperates with one end of a pivoted lever 76. The other end of this pivoted lever extends downwardly adjacent the depending extension 30 and cooperates with one end of a contact element 77, which extends through, and is slidable in the depending extension. The other end of this slidable contact element engages the end bearing seat 20' of the integral projection 13' of the housing, when the latter has been arranged in the position shown in Fig. 1 of the drawings. The engagement of the contact element with the bearing seat 20' limits the extent to which this element is projected in the lateral direction from the depending extension 30 by the action of the coil spring 78, and the gauge 73, indicates in suitable denominations, such as thousandths of an inch, the distance to which the end of the contact element projects from the depending extension 30. The gauge thus indicates the width of the space 79 existing between the bearing seat 20' of the housing and the outer face of the depending extension 30, which indication is a measurement of the shim thickness required at the left-hand end of the differential as seen in Fig. 1.

The gauge 74 is likewise provided with an actuating stem 80, which is slidably mounted in the block 31 and which cooperates at its inner end with a pivoted lever 81. The other end of this lever cooperates with a contact element 82 which extends through and is slidable in the depending extension 32. The outer end of this contact element cooperates with the bearing seat 20' of the integral projection 14' of the housing, in the manner just described for the contact element 77. In other words, the gauge 74 visibly indicates the width of the space existing between the outer face of the depending extension 32 and the adjacent bearing seat 20' of the housing, which indication is a measurement of the shim thickness required at the right hand end of the differential as seen in Fig. 1.

After the thickness of the shims, required for correctly positioning the differential in the housing, has thus been determined, the housing and the differential are removed from the fixture. Shims of the indicated thickness are then selected and applied to the journals of the differential, preferably between the seats or thrust surfaces 21 and the inner races of the bearings 18, after which the differential is positioned in the desired location in the housing as by means of a press fit.

From the foregoing description and the accompanying drawings, it should now be readily seen that I have provided a novel method for assembling differentials in housings of the type having integral seats for the differential bearings, wherein the differential and housing are first relatively positioned to obtain the desired cooperation between the main gear and the drive pinion, and the correct thickness of shims, for positioning the differential in the housing in this relation, is then determined. By the use of this novel method it will be readily seen that the differential for each axle is positioned in the housing with shims of the correct thickness to provide a desired press fit, with the result that the main gear and drive pinion are positioned for efficient and quiet cooperation with a desired predetermined amount of black-lash therebetween. It will also be readily seen that I have provided a novel form of fixture for accurately and economically carrying out my novel method. By the use of this novel fixture the necessary shim thickness can be quickly and accurately determined for each individual axle and its differential, so that in the final assembly the shims exactly compensate for variations existing in the parts with the result that rugged and quiet running axles are produced.

While I have illustrated and described the apparatus and method of my invention in a detailed manner, it should be understood, however, that I do not wish to be limited to the exact steps of procedure, nor to the precise details of construction and arrangement of parts disclosed herein, but regard my invention as including such changes and modifications as do not involve a departure from the spirit of the invention and the scope of the appended claims.

Having thus described my invention, I claim:

1. In apparatus of the character described the combination of means for supporting a housing having an opening thereinto and having a machine element operably mounted therein, means adapted to extend into said housing through said opening for supporting a second machine element in cooperating relation with the first mentioned machine element, means for relatively adjusting said housing and the supporting means for the second machine element to obtain a desired coaction between the machine elements, and means for measuring the extent of variation from standard existing between the second machine element and the housing.

2. In apparatus of the character described the combination of means for supporting a differential housing provided with bearing seats therein and having an opening thereinto, said housing also having a drive pinion operably mounted therein adapted to extend into the housing through said opening, means for supporting a differential having bearing seats thereon, means for relatively adjusting said housing and the differential support to obtain a desired coaction between the main gear of the differential and said drive pinion, and means for measuring the variation from standard in the spacing of the bearing seats of the differential from the bearing seats of the housing.

3. In apparatus of the character described the combination of means for supporting a differential housing having a drive pinion therein and provided with radial and end bearing seats for differential bearings, spaced members for supporting a differential, said spaced members being of a size and shape corresponding substantially with said differential bearings, means for causing the radial bearing seats of said housing to engage said spaced members and the main gear of said differential to mesh with the drive pinion, means for relatively adjusting said housing and said spaced members to obtain the desired back-lash between said main gear and said drive pinion, and means for measuring the clearance between said spaced members and the end seats of the housing.

4. In apparatus of the character described the combination of a frame having a pair of hollow supports adapted to receive the journals of a differential, movable mounting means for one of said supports whereby the spacing of said supports may be varied to permit insertion and removal of the differential journals, means for supporting a differential housing having a drive pinion therein and provided with radial and end seats for differential bearings, said hollow supports being shaped to correspond substantially with said differential bearings whereby engagement of said supports with said radial seats locates the main gear of the differential in the housing to mesh with the drive pinion therein, means for relatively adjusting said housing and the differential supports to obtain a predetermined back-lash between said main gear and said drive pinion, and means for measuring the clearance between said supports and the end seats of said housing.

5. In apparatus of the character described the combination of a frame having a pair of hollow supports adapted to receive the journals of a differential, one of said supports being laterally shiftable, manually operable means for shifting said one support for the insertion and removal of the journals of a differential, means for supporting a differential housing having a drive pinion therein and provided with radial and end seats for differential bearings including means for causing the radial seats of the housing to be yieldingly engaged by said supports whereby the main gear of the differential is located in the housing in mesh with the drive pinion therein, means for adjustably moving said housing relative to said supports to obtain a predetermined back-lash between said main gear and said drive pinion, and means for measuring the clearance between said supports and the end seats of said housing.

6. In apparatus of the character described the combination of a frame having a pair of hollow supports, said supports being of a shape and size to correspond substantially with differential bearings and being adapted to receive the journals of a differential, means for supporting a differential housing having a drive pinion and a plurality of sets of bearing seats therein with one set of bearing seats in engagement with said hollow supports whereby said drive pinion is held in mesh with the main gear of said differential, means for adjustably shifting the housing to obtain a predetermined back-lash between said drive pinion and said main gear, and means for measuring the clearance between said supports and the bearing seats constituting another of said sets.

7. In apparatus of the character described the combination of a frame having a pair of hollow supports, said supports being of a shape and size to correspond substantially with differential bearings and being adapted to receive the journals of a differential, means for supporting a differential housing having a drive pinion and a plurality of sets of bearing seats therein with one set of bearing seats in engagement with said hollow supports whereby said drive pinion is held in mesh with the main gear of said differential, means for adjustably shifting the housing to obtain a predetermined back-lash between said drive pinion and said main gear, and means for measuring the clearance between said supports and the bearing seats constituting another of said sets, the last mentioned means comprising a plurality of gauges, and gauge actuating means including movable contact members adapted to engage the last mentioned bearing seats.

8. In apparatus of the character described the combination of a frame having a pair of hollow supports, said supports being of a shape and size to correspond substantially with differential bearings and being adapted to receive the journals of a differential, means for supporting a differential housing having a drive pinion and a plurality of sets of bearing seats therein with one set of bearing seats in engagement with said hollow supports whereby said drive pinion is held in mesh with the main gear of said differential, means for adjustably shifting the housing to obtain a predetermined back-lash between said drive pinion and said main gear, and means for measuring the clearness between said supports and the bearing seats constituting another of said sets, the last mentioned means comprising a plurality of gauges, and gauge actuating means including contact members movably mounted in said supports for engagement with the last mentioned bearing seats.

9. In apparatus of the character described the combination of a frame having a pair of hollow members adapted to receive the journals of a differential, said hollow members being of a size and shape to correspond substantially with bearings for said differential, a shiftable mount for one of said hollow members whereby the spacing of said members may be varied for the insertion and removal of the differential journals, means for supporting a differential housing having a drive pinion and sets of bearing seats therein with one set of bearing seats engaging said hollow members whereby said drive pinion is held in mesh with the main gear of said diffierential, means for adjustably shifting said housing to obtain a predetermined back-lash between said drive pinion and said main gear, means for measuring the clearance between the stationary hollow member and an adjacent bearing seat on said housing, and means for measuring the clearance between the shiftable hollow member and an adjacent bearing seat on said housing, the last mentioned means comprising a gauge carried by said shiftable mount, gauge actuating means including a contact element movably mounted on the shiftable hollow member for engagement with the last mentioned bearing seat, and means on said shiftable mount operably connecting said contact element with the last mentioned gauge.

10. In apparatus of the character described the combination of a frame, means on said frame for supporting a hollow gear housing of the type having an opening thereinto and a gear member rotatably mounted in the housing, means on said frame adapted to extend into said housing through said opening for supporting a second gear member in the housing in mesh with the first mentioned gear member, means for relatively adjusting said housing and the supporting means for the second gear member to obtain a desired co-action between the gear members, and means for measuring the extent of variation from standard existing between portions of the second gear member and adjacent portions of the housing.

11. In apparatus of the character described the combination of a frame, means on said frame for supporting a housing of the type having an opening thereinto and opposed thrust bearing seats inwardly of said opening, said housing also having a gear member rotatably mounted therein, means on said frame adapted to extend into said housing through said opening for supporting a second gear member in cooperating relation with the first mentioned gear member, means for relatively adjusting said housing and the supporting means for the second gear member to obtain a desired co-action between the gear members, and means for measuring the clearance between said thrust bearing seats and adjacent portions of the supporting means for the second gear member.

JOSEPH E. PADGETT.